July 17, 1956     W. H. CUDMORE     2,755,438
MOISTURE TESTER FOR GRAINS

Filed March 11, 1953     2 Sheets-Sheet 1

INVENTOR
WILLIAM H. CUDMORE
BY
*Frederick C. Bromley*

ATTORNEY.

July 17, 1956 W. H. CUDMORE 2,755,438
MOISTURE TESTER FOR GRAINS
Filed March 11, 1953 2 Sheets-Sheet 2
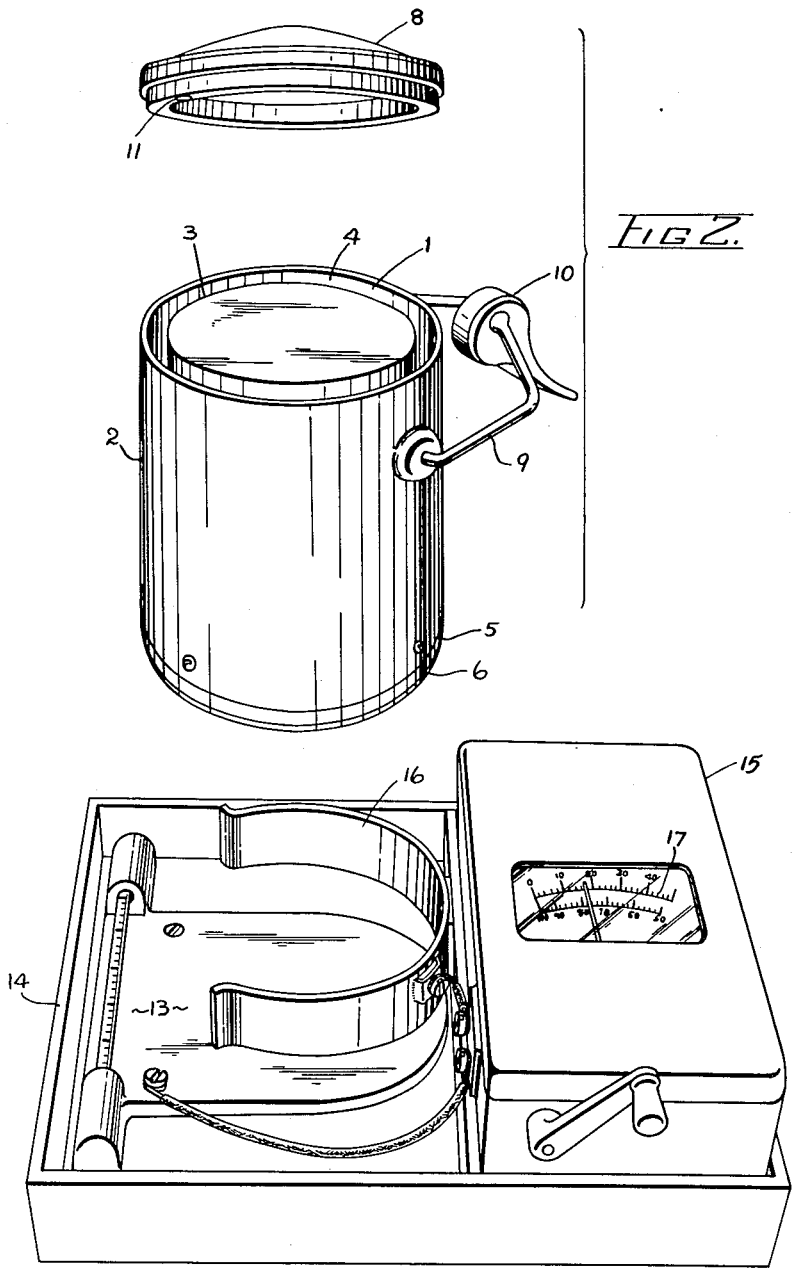
INVENTOR
WILLIAM H. CUDMORE
BY
Frederick C. Bromley
ATTORNEY.

United States Patent Office 2,755,438
Patented July 17, 1956

2,755,438

MOISTURE TESTER FOR GRAINS

William H. Cudmore, Regina, Saskatchewan, Canada

Application March 11, 1953, Serial No. 341,725

9 Claims. (Cl. 324—65)

This invention relates to methods and apparatus for determining the moisture content of a sample of material.

The invention is especially useful as a means for determining the moisture content of cereal grains and the like although this fact is not to be regarded as a limiting condition.

It is known to determine the moisture content of grains and the like by removing virtually all the existing moisture from a given sample of grains under controlled conditions of elevated temperature and to then measure the amount of moisture thus released. This method is technically elegant and is relied upon for standardization of data by official agencies, but suffers from the disadvantage that the test must be carried out under extremely well controlled conditions requiring an onerous and lengthy procedure supervised by highly skilled personnel.

The search for an ingenious means for simplifying the process of determining moisture content has been stimulated by the need for speed in ascertaining the desired data.

When large quantities of cereal grains are channelled into a central storage point from widely scattered sources it is most important to find out very quickly the moisture content of each lot and of the whole mixture of lots.

This information influences grave decisions which must be made quickly and without error by agencies engaged in storing and/or processing cereal grains, and the like.

Errors in information, or delay in ascertainment of moisture content information can result in disastrous explosions of storage bins, sweating of grain stocks, premature germination or other undesired effects.

Spurred by these stimuli the applicant has discovered that the desired information can be arrived at very quickly by determining the ohmic resistance of a standard mass of cereal grains or the like and by then relating this resistance to the temperature of the grain mass at the moment of electrical measurement.

Apparatus for carrying out this method is calibrated against the standard oven test method above mentioned and can then be operated to rapidly repeat the standardized data upon all samples subsequently submitted to test therein.

A construction for carrying out these teachings comprises a standardizing vessel containing electrodes enclosing a specified mass of material to be tested, a "true reading" ohmmeter connected to indicate variations in ohmic resistance of the said mass of material, a thermometer in thermal contact with at least a portion of said mass of material to be tested and a calibration table or calculator showing the moisture content in terms of the ratio of indicated temperature to indicated resistance times a mass constant.

The table of calculations may be in the form of an abac, for example one or more circular discs with cursors, showing temperature versus resistance on one set of scales and moisture digits times a mass-constant on a second set of scales, the scales being relatively slidable to select basic digits as supplied by the testing agency.

If desired the scale of the ohmmeter may be calibrated in terms of moisture content providing different scales for specified different observed temperatures on the one instrument. In this case the mass-constant may be included as a fixed correction when making the scale calibrations. Such an arrangement would require to be kept exclusive to a specified type of material since the mass constant has been included in the calibration.

An ohmmeter could be devised wherein scales are arranged to be interchangeable, each scale being corrected for the mass characteristic of a specified material.

The teachings of the invention will now be further elucidated by reference to an example of construction described with the assistance of the accompanying drawings wherein:

Fig. 2 depicts a perspective view of the standardizing vessel, showing a lid and lid-clamping bail.

Fig. 3 depicts a perspective view of the ohmmeter and a fixture designed to hold and automatically connect the standardizing vessel to the electrical circuitry of the ohmmeter, and Fig. 4 discloses an electric circuit arrangement comprising a preferred means for ascertaining the resistance of the sample contained in the standardizing vessel.

Figure 1:
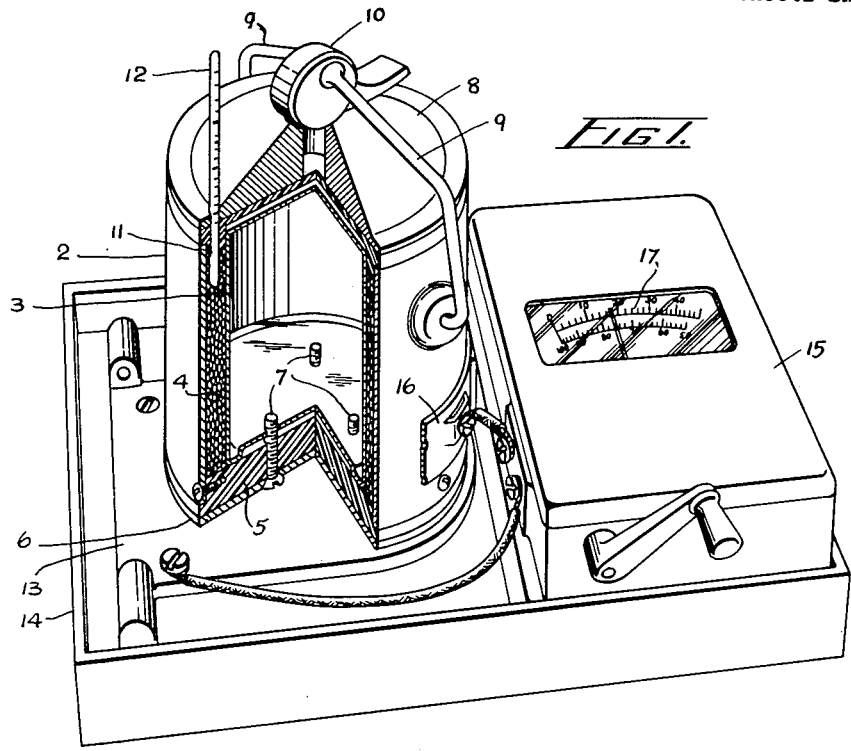
Fig. 1 represents a perspective view of a standardizing vessel and a "true reading" ohmmeter positions for use, the internal arrangement of the vessel and electrodes being clarified by cut-away section.

Referring now to these drawings, the standardizing vessel 1 includes two cylindrical members 2, 3, of suitably stable conductive material and arranged to provide an annular space 4. The outer cylinder 2 and inner cylinder 3 are concentrically mounted in fixed relation upon an insulating base member 5. The base 5 is covered by a metal bottom plate 6 and this plate is electrically connected to cylinder 3 by metal mounting screws, as 7. A lid or cover 8 is firmly but removably seated in the rim of cylinder 2 and can be fastened in place by bail 9 and clamp 10 of the cam lever type. An aperture 11 in lid 8 permits entry into the annular space 4 of a thermometer 12.

The vessel 1 when in use rests with its bottom plate 6 in contact with metal surfaced base 13 in assembly frame 14. The metal surface of base 13 is electrically connected to one measuring terminal of a "true reading" ohmmeter 15. A springy metal clip 16 of a U-shape configuration is designed to snap over the outer cylinder 2 of vessel 1 and is attached to a cross member in frame 14. Clip 16 is electrically connected to the second measuring terminal of the ohmmeter 15.

The apparatus is used as follows. A sample of cereal grain or the like is placed in annular space 4. The space should be completely filled with grain and the lid or cover 8 is then clamped on and the vessel is inserted in the test fixture including the clip 16 and base 13.

A thermometer 12 is inserted through aperture 11 and after a short dwell during which the thermometer reaches its steady state, the resistance of the grain is measured on ohmeter scale 17. The ohms reading and temperature reading are then recorded and compared with corresponding data previously set up in tabulated form and from these tables the percent moisture content of the contents of the standardizing vessel is read off.

Figure 4:
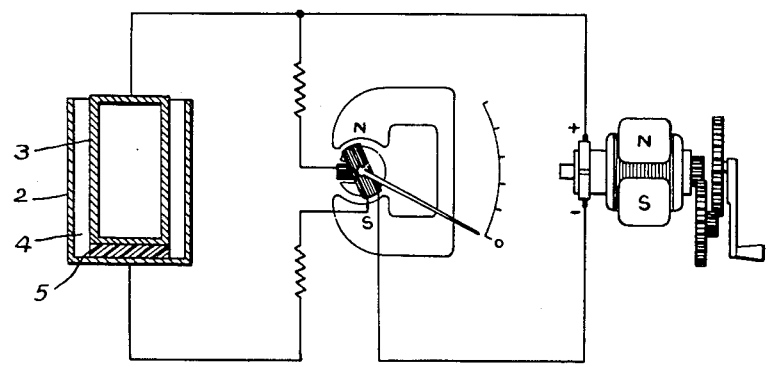

The ohmmeter is obviously required to read values of resistance which are often in the millions of ohms. It is essential, therefore, that the instrument be capable of measuring these resistances, whatever they may be, from hundreds to millions, with the greatest possible accuracy. For this reason the instrument 15 is preferably of the type marketed by the proprietors under the Trademark "Megger." This instrument includes two coils, a control coil and a deflecting coil, both connected in parallel across the generator or battery and arranged so as to oppose one another. The control coil is connected in series with a fixed resistance whereas the deflecting coil is connected in series with the electrodes of the standardizing vessel. Any variations in circuit conditions other than the resistance between electrodes 2, 3 affects both coils in equally opposite sense so that the movements of the control coil are always a true measure of the resistance of the material between electrodes 2, 3. The circuitry of this preferred embodiment is depicted in Figure 4.

The calibration of the apparatus requires reference to some known method and standard system for measuring moisture. An example of calibration may be as follows:

Select a sample of rye and insert it in the standardizing vessel, measure temperature and resistance in the manner suggested above and record these in tabular form. Remove sample and find the true moisture content by a controlled absolute test such as the oven test previously mentioned. Suppose the result indicates 15 per cent moisture. This data is entered in the table. Repeat a succession of tests for different temperatures in a desired range and set up the table on this basis. This table will then always apply to samples of rye having a nominal grain size comparable to the sample.

The work of calibration is then repeated using other grains such as wheat, barley, oats and the like, and separate tables are made for them.

These tables are then, if desired, used just as they are or they may be combined into a composite table wherein the differences between grain types, or between grain sizes, or both, are resolved into a mass-constant by which the nominal moisture content (temperature/resistance ratio) of some selected material such as rye, is modified when the material is of a particular designated kind other than the nominal.

Of course the exact data to be set down in the tables will depend upon the mass of material enclosed by the annular space between cylinders 2 and 3. It is evident that a longer cylinder would sample a larger quantity of grain and show a lower relative resistance reading under given conditions. Also, a narrower space between the cylinders would sample a smaller quantity of grain and also show a smaller relative resistance.

Evidently, if the size of the annular space is standardized and all cylinders in production are made exactly the same, the prototype set, only, need be calibrated and the calibration will hold for all test sets made like it, since the measuring instrument or megger is also uniform in production. Therefore, once a standard size for the vessel 1 has been determined, the laborious task of relating the temperature and resistance readings to, say, a Government standard moisture tester, need be done only once.

In this way the invention provides a secondary standard of moisture content measuring which can be duplicated any number of times by merely holding close mechanical tolerances in the manufacture of the standardizing vessel 1.

The benefits then conferred by the invention reside in the simple exactness with which a secondary standard can be provided in profuse quantity and can be used in any location near or far from sources of primary standards of measurement, and, further, in the relatively great speed with which the simple measurements can be made—the time being cut from hours to a few minutes or at most a few seconds after the thermometer has reached its steady state. The speed of measurement is limited mainly by the inertia of the thermometer used. This is never great for the reason that only one temperature reading is required per test.

The standardizing vessel may conveniently have its outer cylinder about 3 inches in diameter and 3 inches in height. The inner cylinder may be 2½ inches in diameter and just under 3 inches in length: the top of the inner cylinder should be closed and should just clear the lid or cover 8 so that no electric contact will exist, ever, between the inner electrode and the lid 8 which will be "alive" to the outer cylinder (electrode) 2. In such an arrangement the annular space will be about ¼ inch in thickness and just under 3 inches in electrically effective length.

The inner cylinder can be made removable and cylinders of various diameters can then be interchangeably fitted so as to provide a selection of annular thicknesses.

The mass constant factor can be resolved to be commensurate with thickness of annulus. In this way different inner cylinders can be provided to simulate different mass constants and to provide a series of standardized vessels for different grains, with all readings thus standardized to one table, that is to say, instead of modifying a table for a given grain by using a mass-constant correction factor, this factor could be automatically built into the standardizing vessel's construction by providing therefor variable dimensions for the mass-space which is the annular thickness.

The foregoing dimensions are quite arbitrary and not in any way limiting. Different fields of utility may envisage standardizing vessels of different size but it is well to remember that a size once chosen for a given purpose should preferably be held to, as otherwise a fresh prototype calibration must be made for each change in size. This is a lengthy and onerous operation as already mentioned.

Exemplifying one tabulation for the test we have:

*Material—Rye*

| Temperature of Grain in cavity | Ohmmeter Scale (arbitrary) | Moisture, percent |
| --- | --- | --- |
| 20° C | 17 | 15 |
| 25° C | 22 | 15 |
| 30° C | 27 | 15 |
| 20° C | 7 | 14 |
| 25° C | 41½ | 19 |

It is evident that this tabulation could be set up in a great variety of ways showing as the base constant either the material (as above exemplified) or temperature or ohm scales or even the information sought, namely, the moisture content itself.

We could say for example, what temperature and/or resistance factor must we have to obtain a grain-moisture constant of 15%? The above tabulations, from experimental measurements, show that temperature and resistance are interdependent for a constant of moisture.

Whereas the foregoing description has depicted a particular example of construction embodying the teachings of the invention it is evident that many modifications can be made without departing from the broad spirit of these teachings. All such modifications are to be regarded as lying within the ambit of the appended claims.

What I claim is:

1. Apparatus for measuring the moisture content of cereal grains and the like comprising a standardizing vessel including an outer and an inner wall-electrode providing an annular space of predetermined length and thickness, an insulating base for closing one end of said space and for electrically isolating said wall-electrodes, a conductive plate forming a bottom surface for said insulating base and connected electrically to said inner wall, a cover removably closing the other end of said vessel, an assembly frame, a metal-surfaced base for supporting said vessel in contact with its said conductive plate, clip means for receiving, contacting and restraining said vessel upon its outer wall electrode when in situ upon said supporting base, support means for said clip forming part of said assembly frame, an ohmmeter positioned within said frame, and electrical circuit means connecting the respective measuring terminals of said ohmmeter to said supporting base and to said clip respectively.

2. Apparatus of the type defined in claim 1 wherein the dial of the ohmmeter is divided into a plurality of scales, one for each of a range of selected temperatures, and the calibrations of each scale are defined in percent moisture content with respect to each said temperature.

3. Apparatus of the type defined by claim 1 wherein the said inner wall electrode is made detachable and wherein provision is made for inserting in the said vessel inner walls of different selected diameters.

4. Apparatus of the type defined by claim 1 wherein the outer wall includes a bail and clamp hinged thereon and dimensioned to retain the said cover in detachably locked relation with said outer wall.

5. A moisture tester for grains comprising an enclosing vessel for containing a mass of grain, said vessel including outer and inner members which are conductors of electricity, said members being insulated from each other, a supporting frame of non-conducting material, a conducting plate thereon for seating said vessel, a contact element on said vessel and in electric contact with said plate when the vessel is seated on the plate, means insulating said contact element from said outer member, clip means detachably retaining said vessel on said plate and having electric contact with said outer member, and electric conductors for placing said plate and said clip means in circuit with an ohmmeter.

6. A structure as defined in claim 5, wherein the outer and the inner members of the vessel are cylindrical and of different diameters to provide an annular grain receptacle.

7. A structure as defined in claim 5, wherein the outer and the inner members of the vessel are cylindrical and of different diameters to provide an annular grain receptacle having a mouth, and wherein a detachable closure is fitted on said vessel and is supplied with an aperture for insertion of a thermometer.

8. A structure as defined in claim 5, in which the clip means is mounted on the frame, and in which the frame is recessed to seat the ohmmeter.

9. Apparatus for measuring the moisture content of cereal grains and the like comprising a standardizing vessel including an outer and an inner wall-electrode providing an annular space of predetermined length and thickness, an insulating base for closing one end of said space and for electrically isolating said wall-electrodes, a conductive plate forming a bottom surface for said insulating base and connected electrically to said inner wall, a cover removably closing the other end of said vessel but not contacting the said inner wall, an assembly frame, a metal-surfaced base for supporting said vessel in contact with its said conductive plate, clip means for receiving, contacting and restraining said vessel upon its outer wall-electrode when in situ upon said supporting base, support means for said clip forming part of said assembly frame, an ohmmeter positioned within said frame, electrical circuit means connecting the respective measuring terminals of said ohmmeter to said supporting base and to said clip respectively, and aperture means in said cover for admitting a thermally sensitive device to the said annular space.

References Cited in the file of this patent

UNITED STATES PATENTS

| | | |
|---|---|---|
| 1,961,965 | Fisher | June 5, 1934 |
| 2,063,840 | Fairchild et al. | Dec. 8, 1936 |
| 2,542,928 | Kimball et al. | Feb. 20, 1951 |

FOREIGN PATENTS

| | | |
|---|---|---|
| 116,478 | Australia | Jan. 20, 1943 |
| 559,240 | Great Britain | Feb. 10, 1944 |